US011029550B2

(12) United States Patent
Asozu et al.

(10) Patent No.: US 11,029,550 B2
(45) Date of Patent: Jun. 8, 2021

(54) ELECTRO-OPTICAL DEVICE (71) Applicant: Japan Display Inc., Minato-ku (JP)

(72) Inventors: Genki Asozu, Tokyo (JP); Toshiyuki Higano, Tokyo (JP); Emi Higano, Tokyo (JP)

(73) Assignee: Japan Display Inc., Minato-ku (JP)

( * ) Notice: Subject to any disclaimer, the term of this patent is extended or adjusted under 35 U.S.C. 154(b) by 253 days.

(21) Appl. No.: 16/053,855

(22) Filed: Aug. 3, 2018

(65) Prior Publication Data
US 2019/0041678 A1    Feb. 7, 2019

(30) Foreign Application Priority Data

Aug. 7, 2017 (JP) .............................. JP2017-152647

(51) Int. Cl.
*G02F 1/1333* (2006.01)
*G02F 1/133* (2006.01)
(Continued)

(52) U.S. Cl.
CPC ...... *G02F 1/13338* (2013.01); *G02F 1/13306* (2013.01); *G02F 1/13452* (2013.01);
(Continued)

(58) Field of Classification Search
CPC .. G02F 1/0136; G02F 1/021; G02F 1/133385; G02F 1/13471; G02F 2203/055; G02F 2203/12; G02F 1/0123; G02F 1/1396; G02F 1/225; G02F 1/292; G02F 2001/212; G02F 2201/17; G02F 2203/15; G02F 2/02; G02F 1/0102; G02F 1/025; G02F 1/0311; G02F 1/035; G02F 1/09; G02F 1/133533; G02F 1/133536; G02F 1/1354; G02F 1/2255; G02F 2001/0139; G02F 2001/13355; G02F 2201/16; G02F 2202/32; G02F 2203/06; G02F 2203/50; G02F 2203/58; G02F 1/01; G02F 1/011; G02F 1/0128; G02F 1/0147; G02F 1/03;
(Continued)

(56) References Cited

U.S. PATENT DOCUMENTS

2008/0107372 A1* 5/2008 Fujimori ................... G02F 1/21
385/2
2008/0118202 A1* 5/2008 Kato ......................... G02B 6/43
385/14

(Continued)

FOREIGN PATENT DOCUMENTS

JP 2011-227369 11/2011
JP 2017-044715 3/2017

*Primary Examiner* — Collin X Beatty
*Assistant Examiner* — Grant A Gagnon
(74) *Attorney, Agent, or Firm* — Oblon, McClelland, Maier & Neustadt, L.L.P.

(57) ABSTRACT

According to one embodiment, an electro-optical device comprises a flexible first substrate and a flexible second substrate which include an electro-optical area, a drive area in the first substrate with terminals formed in the drive area, an external drive circuit connected to the terminals, conductive lines extending from the terminals to the electro-optical area side, and a first resin film overlapping the conductive lines. Further, a gap is formed between the first resin film and the second substrate in planar view.

20 Claims, 10 Drawing Sheets

(51) Int. Cl.
*G02F 1/1335* (2006.01)
*G02F 1/13357* (2006.01)
*G02F 1/1345* (2006.01)

(52) U.S. Cl.
CPC .. *G02F 1/133305* (2013.01); *G02F 1/133528* (2013.01); *G02F 1/133602* (2013.01); *G02F 2201/50* (2013.01)

(58) Field of Classification Search
CPC .... G02F 1/0316; G02F 1/0322; G02F 1/0327; G02F 1/0338; G02F 1/0353; G02F 1/0356; G02F 1/05; G02F 1/061; G02F 1/093; G02F 1/0955; G02F 1/13; G02F 1/1313; G02F 1/13306; G02F 1/13318; G02F 1/13338; G02F 1/1334; G02F 1/133553; G02F 1/133602; G02F 1/134327; G02F 1/1347; G02F 1/136277; G02F 1/13718; G02F 1/167; G02F 1/21; G02F 1/2257; G02F 1/29; G02F 1/31; G02F 1/313; G02F 1/3136; G02F 1/3511; G02F 1/3526; G02F 1/3551; G02F 1/3558; G02F 1/365; G02F 1/39; G02F 2001/133543; G02F 2001/133545; G02F 2001/133548; G02F 2001/133567; G02F 2001/133638; G02F 2001/1355; G02F 2001/1678; G02F 2001/291; G02F 2001/3528; G02F 2201/02; G02F 2201/124; G02F 2201/18; G02F 2201/307; G02F 2201/343; G02F 2201/36; G02F 2201/44; G02F 2202/10; G02F 2202/30; G02F 2202/40; G02F 2203/01; G02F 2203/02; G02F 2203/04; G02F 2203/09; G02F 2203/10; G02F 2203/11; G02F 2203/21; G02F 2203/48; G02F 2203/54; G02F 2/002
USPC .......................................................... 359/246
See application file for complete search history.

(56) References Cited

U.S. PATENT DOCUMENTS

2011/0260180 A1 10/2011 Kuranaga et al.
2016/0132159 A1* 5/2016 Aoki ...................... G06F 3/044
345/174

* cited by examiner

ELECTRO-OPTICAL DEVICE

CROSS-REFERENCE TO RELATED APPLICATIONS

This application is based upon and claims the benefit of priority from Japanese Patent Application No. 2017-152647, filed Aug. 7, 2017, the entire contents of which are incorporated herein by reference.

FIELD

Embodiments described herein relate generally to a flexible electro-optical device.

BACKGROUND

A flexible electro-optical device comprises a base formed of a flexible material such as polyimide resin. After applying the flexible base on a substrate of glass, quartz, or the like and hardening the flexible base, an interface is irradiated with laser light and the flexible base peeled from the substrate. A procedure of manufacturing the flexible electro-optical device does not need such a process of peeling the flexible base.

In a rigid electro-optical device, a drive area is covered with a resin film or the like for protecting lines. If the drive area of the flexible electro-optical device is covered with a resin film similarly to a rigid electro-optical device, there is a case where the glass substrate bonded to the resin film cannot be peeled.

DETAILED DESCRIPTION

In general, according to one embodiment, an electro-optical device comprises a flexible first substrate and a flexible second substrate which include an electro-optical area, a drive area in the first substrate with terminals formed in the drive area, an external drive circuit connected to the terminals, conductive lines extending from the terminals to the electro-optical area side, and a first resin film overlapping the conductive lines. Further, a gap is formed between the first resin film and the second substrate in planar view.

Various embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings are illustrated schematically rather than as an accurate representation of what is implemented, but such schematic illustration is merely exemplary, and in no way restricts the interpretation of the invention. In the drawings, reference numbers of continuously arranged elements equivalent or similar to each other are omitted in some cases. Furthermore, in the description and figures of the present application, structural elements having the same or similar functions will be referred to by the same reference numbers and detailed explanations of them that are considered redundant may be omitted.

In this specification, expressions such as "α includes A, B, or C", "α includes any one of A, B, and C" and "α is selected from a group consisting of A, B, and C" do not exclude a case where α includes combinations of A, B, and C unless otherwise specified. Furthermore, these expressions do not exclude a case where α includes other elements.

In the present specification, expressions "member β on/above member α" and "member β under/below member α" may simply not only a case where member α and member β are in contact with each other, but also a case where the other member is intervened between member a and member β.

In the following explanations, an electro-optical device DSP, which is a liquid crystal display device, is disclosed as an example of the electro-optical device. However, each embodiment does not prevent application of individual technical ideas disclosed in the embodiment to other types of display devices. The major configuration explained in the embodiments can also be applied to a self-luminous display device such as an organic electroluminescent display element, and the like, an electronic paper-type display device comprising an electrophoretic element, and the like, a display device employing micro-electromechanical system (MEMS), or a display device employing electrochromism. The electro-optical device DSP can be used for, for example, various devices such as a smartphone, a tablet, a mobile phone, a computer, a television receiver, an in-vehicle unit, a game console, and a wearable device.

Figure 1:
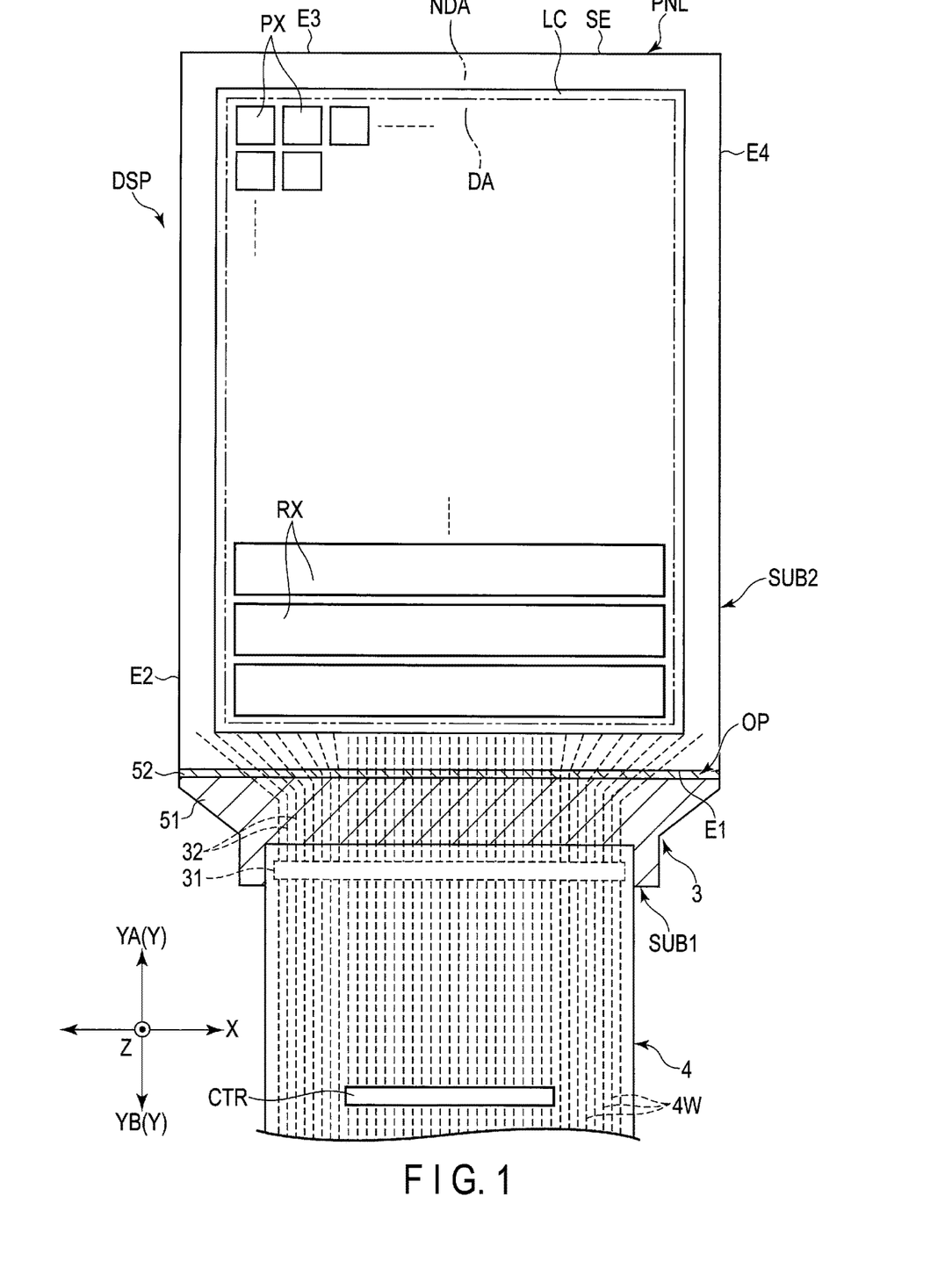
FIG. 1 is a plan view showing a schematic configuration of an electro-optical device common to embodiments.

FIG. 1 is a plan view showing a schematic configuration of an electro-optical device DSP common to embodiments. The electro-optical device DSP comprises, for example, an electro-optical panel (liquid crystal cell) PNL which displays an image on a display surface, and an external drive circuit 4 mounted on the drive area 3 of the electro-optical panel PNL. In the following explanations, seeing from a display surface to a back surface in the electro-optical panel PNL is defined as planar view.

The electro-optical panel PNL may be a transmissive panel which displays an image by urging the light from the back surface to be transmitted selectively, or a reflective panel which displays an image by urging the light incident on the display surface to be reflected selectively. In the transmissive panel, the electro-optical device DSP further comprises a backlight BL (shown in FIG. 2) which emits the light to the back surface of the electro-optical panel PNL. The external drive circuit 4 controls operations of the electro-optical panel PNL and the backlight BL.

The electro-optical panel PNL comprises a first substrate (array substrate) SUB1, a second substrate (counter-substrate) SUB2, a sealing member (adhesive) SE, and a liquid crystal layer LC. The second substrate SUB2 is formed to have an approximately rectangular shape having first to fourth end surfaces E1, E2, E3, and E4. The second substrate SUB2 is opposed to the first substrate SUB1 in thickness direction Z of the electro-optical panel PNL. The first substrate SUB1 is formed to be larger than the second substrate SUB2 and includes a drive area 3 exposed from the second substrate SUB2.

The sealing member SE is formed in an annular shape along the first to fourth end surfaces E1, E2, E3, and E4 of the second substrate SUB2 to bond the first substrate SUB1 and the second substrate SUB2. The liquid crystal layer LC is disposed between the first substrate SUB1 and the second substrate SUB2, inside the sealing member SE. The liquid crystal layer LC is an example of an electro-optical layer electrically driven to urge light to be selectively transmitted.

The display surface of the electro-optical panel PNL includes an electro-optical area DA in which plural pixels PX are arrayed in a matrix, and a frame-shaped non-electro-optical area NDA surrounding the electro-optical area DA. In the non-electro-optical area NDA, various circuits are formed to supply signals to the pixels PX in the electro-optical area DA. The drive area 3 is included in the non-electro-optical area NDA and extends on a side opposite to the electro-optical area DA from the first end surface E1 of the second substrate SUB2.

In the drive area 3, the first substrate SUB1 comprises terminals 31 and conductive lines 32. The terminals 31 are electrically connected to an external drive circuit 4. Various signals are supplied from the external drive circuit 4 to the terminals 31. The conductive lines 32 extend from the terminals 31 to the electro-optical area DA side to make electric connection between the terminals 31 and the various circuits formed in the non-electro-optical area NDA.

For example, a control module CTR is mounted on the external drive circuit 4. The control module CTR sequentially receives 1-frame image data which is to be displayed in the electro-optical area DA from a main board or the like of an electronic device in which the electro-optical device DSP is built. The image data include, for example, information such as display colors of the respective pixels PX, and the like. The control module CTR supplies signals to drive the pixels PX to the electro-optical panel PNL, based on the received image data.

Figure 2:
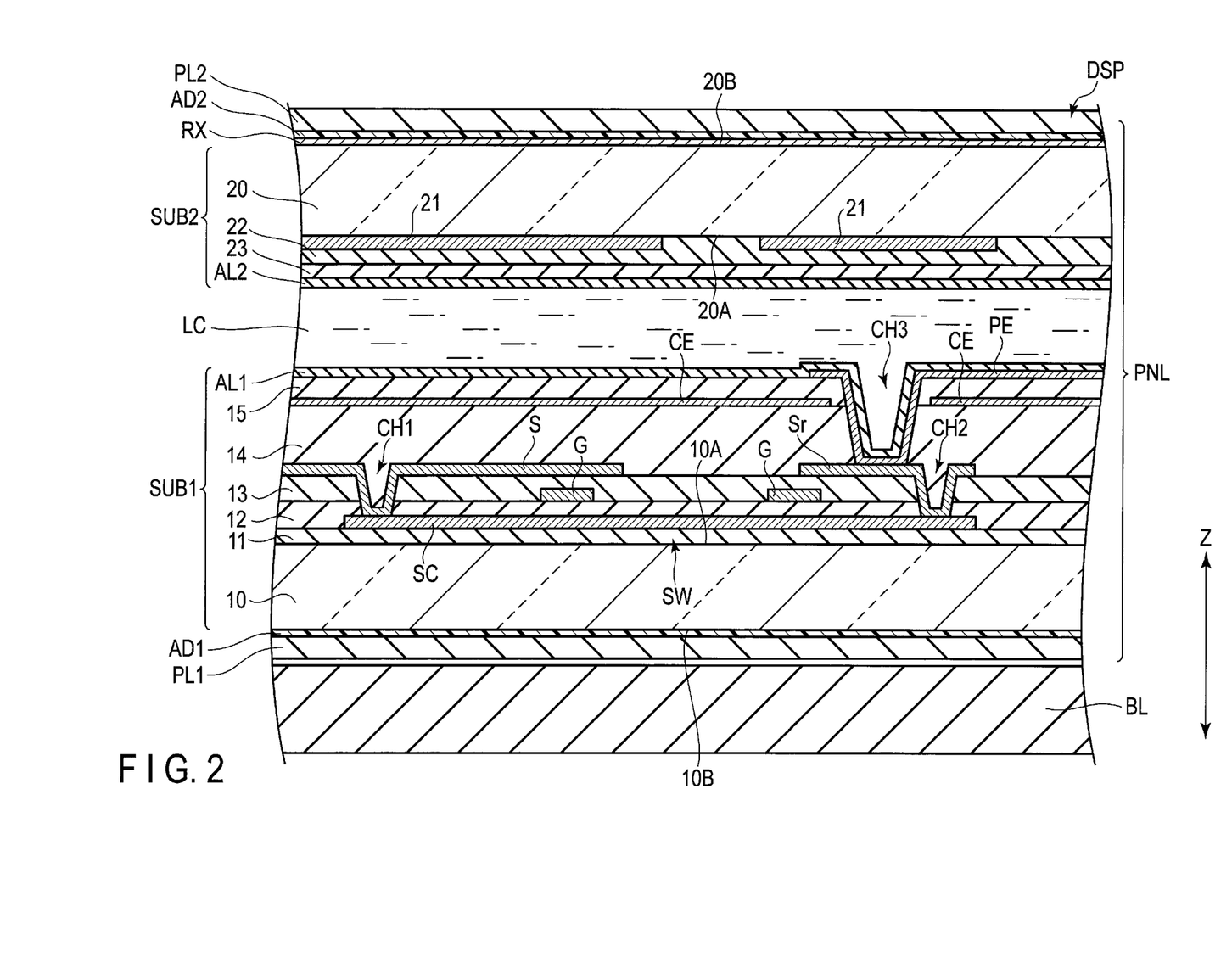
FIG. 2 is a cross-sectional view schematically showing a structure of the electro-optical device in an electro-optical area shown in FIG. 1.

FIG. 2 is a cross-sectional view schematically showing a structure of the electro-optical device DSP in the electro-optical area DA. In the example shown in FIG. 2, the electro-optical device DSP is configured to correspond to the display mode mainly using the lateral electric field approximately parallel to the display surface. The electro-optical device PNL may be configured to correspond to a display mode using a longitudinal electric field perpendicular to the display surface, an electric field inclined to the display surface, or a combination of the electric fields.

As shown in FIG. 2, the first substrate SUB1 comprises a first flexible base 10, first to fifth insulating layers 11, 12, 13, 14, and 15, a semiconductor layer SC, a scanning signal line G, a video signal line S, a relay electrode Sr, a common electrode CE, a pixel electrode PE, and a first alignment film AL1. The first substrate SUB1 can be bent since the first substrate SUB1 includes the first flexible base 10 having flexibility as its base.

The first flexible base 10 is formed of, for example, polyimide resin and has an optical transparency and an insulation property in addition to the flexibility. The first flexible base 10 comprises a first surface 10A opposed to the second substrate SUB2, and a second surface 10B located opposite to the first surface 10A. The first insulating layer 11 covers a first surface 10A of the first flexible base 10.

The semiconductor layer SC is formed on the first insulating layer 11. The second insulating layer 12 covers the first insulating layer 11 and the semiconductor layer SC. The scan signal line G is formed on the second insulating layer 12. The third insulating layer 13 covers the second insulating layer 12 and the scanning signal line G. The video signal line S and a relay electrode Sr are formed on the third insulating layer 13.

The fourth insulating layer 14 covers the third insulating layer 13, the video signal line S, and the relay electrode Sr. The fourth insulating layer 14 is, for example, an organic insulating layer formed of a photosensitive resin such as acrylic resin. The fourth insulating layer 14 has a function of flattening the unevenness of the thin-film transistor and is formed to be thicker than the first to third and fifth insulating layers 11, 12, 13, and 15 and the first alignment film AL1.

The common electrode CE is formed on the fourth insulating layer 14. The fifth insulating layer 15 covers the fourth insulating layer 14 and the common electrode CE. The pixel electrode PE is formed on the fifth insulating layer 15. The pixel electrode PE may be formed under the fifth insulating layer 15, and the common electrode CE may be formed on the fifth insulating layer 15. The first alignment film AL1 covers the fifth insulating layer 15 and the pixel electrode PE.

A first contact hole CH1 and a second contact hole CH2 penetrate the second insulating layer 12 and the third insulating layer 13. A third contact hole CH3 penetrates the fourth insulating layer 14 and the fifth insulating layer 15. The video signal line S is in contact with the semiconductor layer SC through the first contact hole CH1. The relay electrode Sr is in contact with the semiconductor layer SC through the second contact hole CH2. Either the video signal line S or the relay electrode Sr is a source electrode, and the other is a drain electrode. The semiconductor layer SC, the source electrode, and the drain electrode constitute a thin-film transistor (TFT).

The pixel electrode PE is in contact with the relay electrode Sr through the third contact hole CH3 and is electrically connected to the semiconductor layer SC. When a voltage is supplied to the pixel electrode PE via a source electrode, an electric field is formed between the pixel electrodes PE and the common electrode CE to change the alignment of the liquid crystal molecules of the liquid crystal layer LC.

The second substrate SUB2 comprises a second flexible base 20, a light-shielding layer 21, a color filter layer 22, an overcoat layer 23, and a second alignment film AL2. The color filter layer 22 may be formed on the first substrate SUB1. The second flexible base 20 is formed of the same resin material as the first flexible base 10. The second substrate SUB2 can be bent since the second substrate SUB2 includes the second flexible base 20 having flexibility as its base.

The second flexible base 20 comprises a third surface 20A opposed to the first surface 10A of the first flexible base 10, and a fourth surface 20B located opposite to the third surface 20A. The light-shielding layer 21 is formed on the third surface 20A of the second flexible base 20. The color filter layer 22 covers the third surface 20A and the light-shielding layer 21. The color filter layer 22 is colored in a color corresponding to the sub-pixel which forms the pixel PX.

The overcoat layer 23 covers the color filter 22. The second alignment film AL2 covers the overcoat layer 23. The liquid crystal layer LC is disposed between the first alignment film AL1 and the second alignment film AL2. The first alignment film AL1 and the second alignment film AL2 urge the liquid crystal molecules of the liquid crystal layer LC to be aligned in a state in which no voltage is applied to the pixel electrode PE.

A first polarizer PL1 is applied to the second surface 10B of the first flexible base 10 via a first adhesive layer AD1. If the backlight BL which emits polarized light is employed, the first polarizer PL1 may not be disposed. A second polarizer PL2 is applied to the fourth surface 20B of the second flexible base 20 via a second adhesive layer AD2. The second adhesive layer AD2 may contain conductive particles. The second polarizer PL2 is an example of a polarizing member disposed on the second substrate SUB2.

The electro-optical device DSP may comprise a touch panel. The touch panel comprises, for example, a touch sensor composed of a transmitter electrode and a receiver electrode opposed to each other, and a selector circuit which drives the touch sensor. An electrostatic capacitance C is formed between the transmitter electrode and the receiver electrode. The selector circuit changes any one of areas of the touch sensor by sensing or in time division.

In the example shown in FIG. 2, the common electrode CE of the first substrate SUB1 has a function of the transmitter electrode. In this configuration, the common electrode CE is used for image display, the common electrode CE is used for sensing, or the selector circuit changes the areas in time division. The selector circuit may be formed in the control module CTR or in the non-electro-optical area NDA.

A receiver electrode RX is disposed between the second adhesive layer AD2 and the second substrate SUB2. A transmitter electrode may be disposed or both of a transmitter electrode and the receiver electrode may be disposed between the second adhesive layer AD2 and the second substrate SUB2, though not illustrated in the drawing. The transmitter electrode and the receiver electrode are examples of the touch panel electrodes.

First Embodiment

The electro-optical device DSP according to a first embodiment and its modified example will be explained with reference to FIG. 3 to FIG. 9. The first embodiment and each of embodiments explained below have features of comprising a first resin film 51 which covers a conductive line 32 of the drive area 3 and a gap OP formed between an end portion 51E of a first resin film 51 and the end portion E1 of the second substrate SUB2. The first resin film 51 is formed of, for example, photosensitive acrylic resin or the like.

Figure 3:
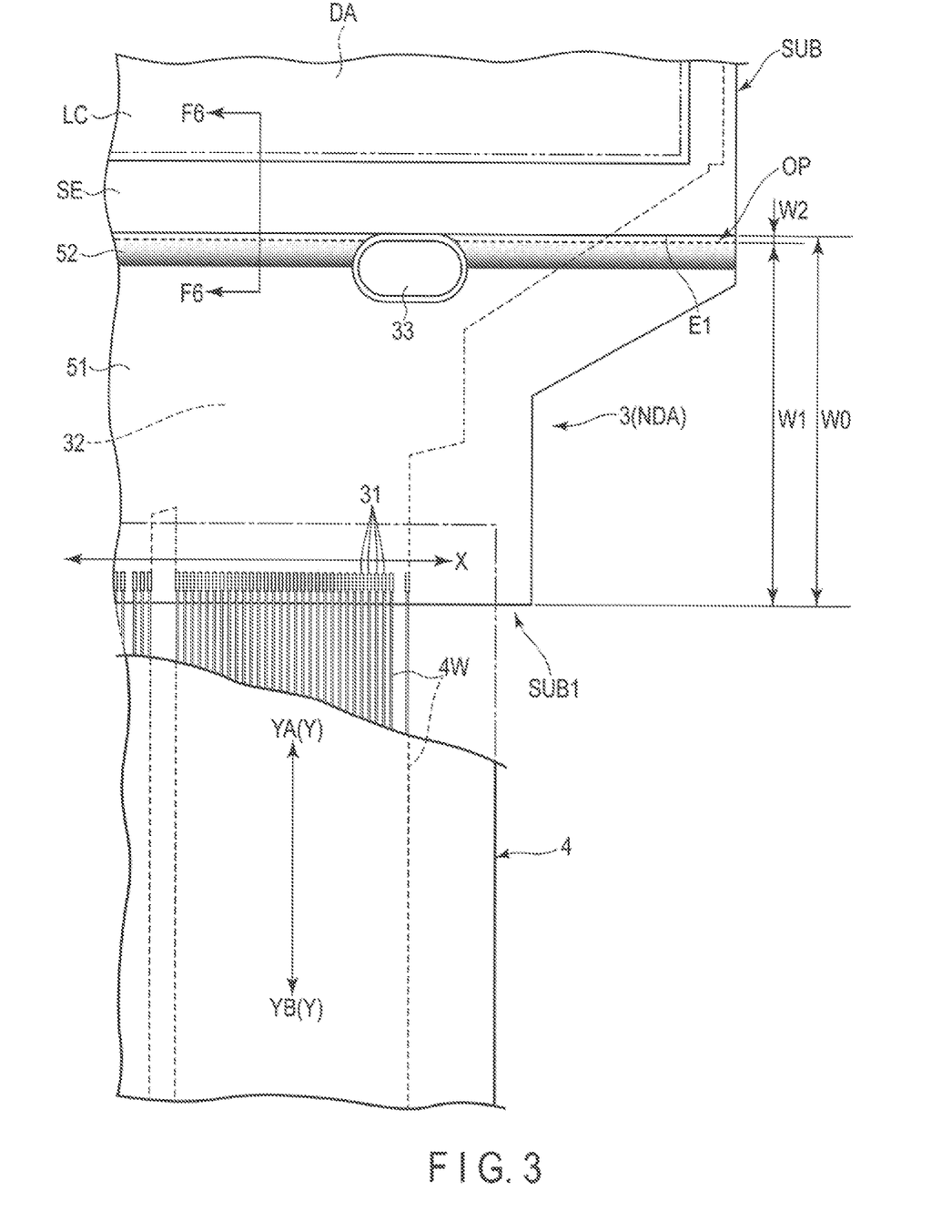
FIG. 3 is an enlarged plan view showing a drive area of the electro-optical device according to a first embodiment.

FIG. 3 is an enlarged plan view showing the drive area 3 of the first embodiment. A conductive line 4W inside the external drive circuit 4 is exposed for convenience of explanations. As shown in FIG. 3, terminals 31 formed in the drive area 3 are aligned in the first direction X parallel to the first end surface E1 of the second substrate SUB2.

The conductive line 4W of the external drive circuit 4 extends in the second direction Y which intersects the first direction X. The second direction Y includes a second A direction YA traveling from the terminals 31 to the electro-optical area DA and a second B direction YB opposite to the second A direction. In the example shown in FIG. 3, the first direction X and the second direction Y are perpendicular to each other.

Figure 6:
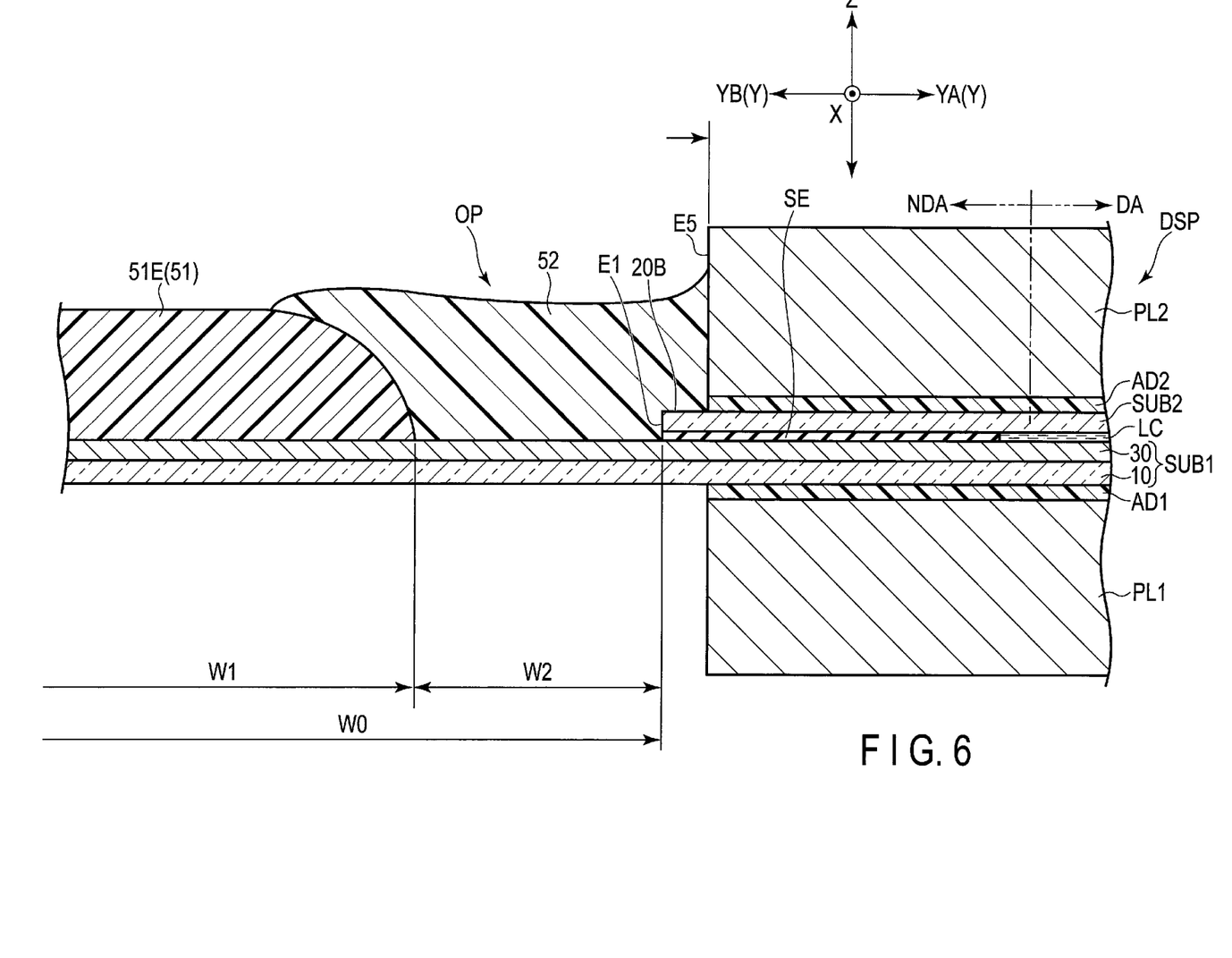
FIG. 6 is a cross-sectional view seen along line F6-F6 in FIG. 3.

A width W1 of the first resin film 51 is desirably 90% or more and less than 100% of a width W0 of the drive area 3, in the second direction Y. The width W1 is a residue obtained by subtracting a width W2 of the gap OP from the width W0. An example of the width W2 is 200 μm. The width W2 is arbitrarily selected in accordance with the method of processing the first resin film 51 and may be narrow or wider than this. The width W2 is set based on a bottom portion of the first resin film 51 as shown in FIG. 6, in cross-sectional view.

Figure 4:
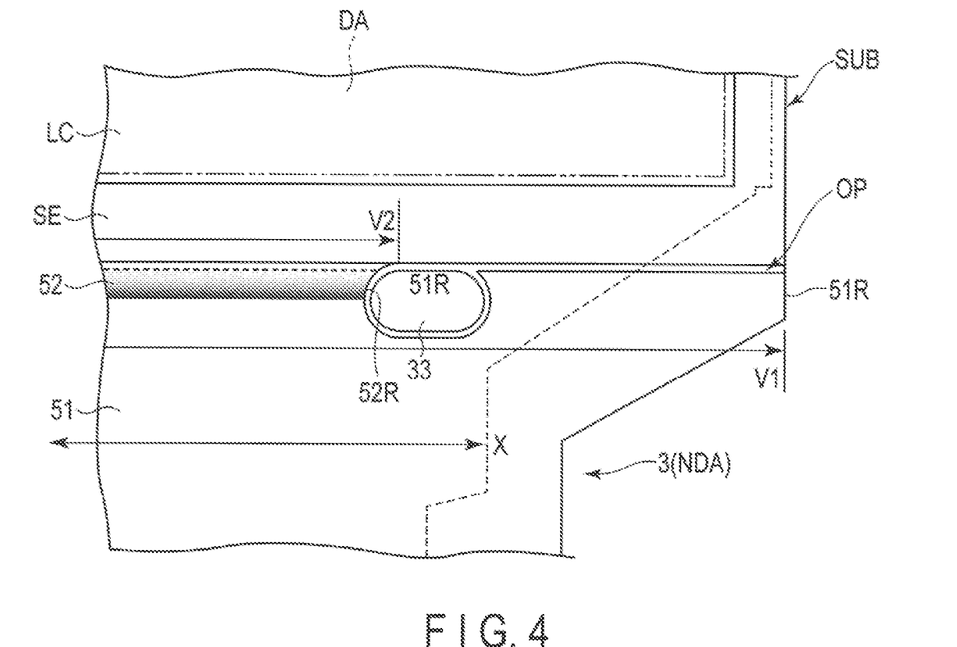
FIG. 4 is a plan view showing a modified example of a second resin film shown in FIG. 3.

In the example shown in FIG. 3, a width of a second resin film 52 in the first direction X is the same as a width of the first resin film 51 in the first direction X. As shown in FIG. 4, however, an end portion 52R of the second resin film 52 in the first direction X may be located on a side inner than a conductive pad 33 such that a second resin film 52 and a conductive pad 33, which will be explained below, do not overlap each other. In this case, a width V2 between the end portion 52R of the second resin film 52 in the first direction X and the other end portion becomes narrower than a width V1 between an end portion 51R of the first resin film 51 in the first direction X and the other end portion.

In a rigid electro-optical device, since the width of the drive area formed of a rigid base is the width of the frame area, the width of the drive area needs to be narrowed to the limit. In the flexible electro-optical device such as the first embodiment, since the flexible drive area 3 can be bent to the back surface side, the width W0 of the drive area 3 is not particularly limited. An example of the width W0 is approximately 12 mm. In this case, the width W1 of the first resin film 51 is, for example, approximately 98% of the width W0.

In the drive area 3, not only the terminals 31 and the conductive lines 32, but also the conductive pad 33 are formed. The number of conductive pads 33 may be plural or single. The conductive pad 33 is formed not to overlap the first resin film 51 in planar view and is electrically connected to, for example, a conductive member formed in the second substrate SUB2 or a conductive member stuck on the second substrate SUB2.

Figure 5:
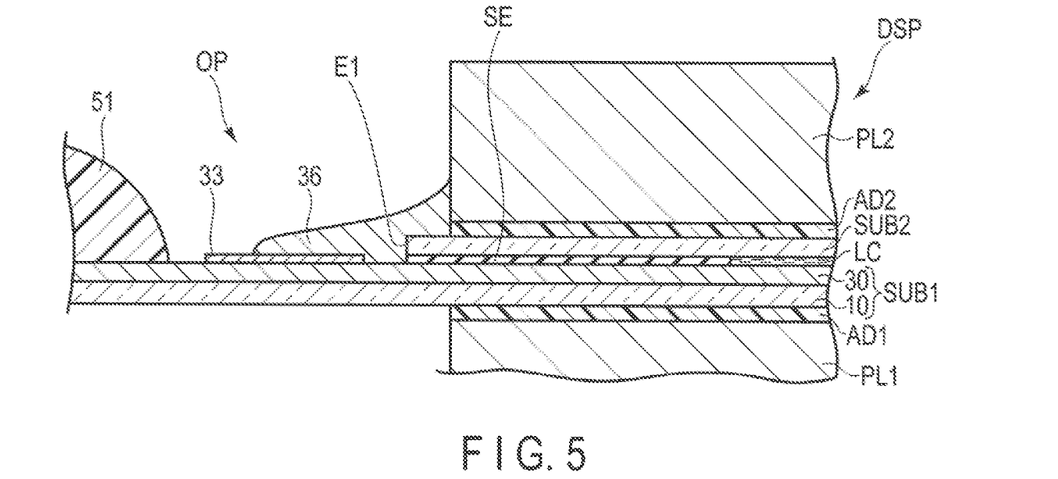
FIG. 5 is a cross-sectional view showing an example of connecting a second adhesive layer to a ground potential via a conductive pad.

The above-explained second adhesive layer AD2 (conductive adhesive) containing conductive particles is an example of the conductive member. As shown in FIG. 5, if the second adhesive layer AD2 and the conductive pad 33 are connected by the conductive paste 36 and a certain voltage such as a ground voltage is applied to the second adhesive layer AD2 via the conductive pad 33, the second adhesive layer AD2 functions as a conductive film which blocks static electricity from the outside and protects the electro-optical panel PNL. For example, the conductive paste 36 sequentially covers from an upper surface of the conductive pad 33 to the side surface of the second adhesive layer AD2.

The conductive member may be a touch panel electrode as the other example. The touch panel electrode may be either the transmitter electrode or the receiver electrode or both of the electrodes. If the touch panel electrode is connected to the selector circuit via the conductive pad 33, the touch panel drive circuit can be built in the external drive circuit 4. As a result, the external drive circuit for image display and the external drive circuit for touch panel can be integrated.

FIG. 6 is a cross-sectional view seen along line F6-F6 in FIG. 3. As shown in FIG. 6, the gap OP between the first resin film 51 and the second substrate SUB2 is filled with the second resin film 52. The second resin film 52 is formed of the same material as the first resin film 51. At the gap OP, the end portion E5 of the second polarizer PL2 is located more closely to the electro-optical area DA side (second A direction YA) than the end portion E1 of the second substrate SUB2. For this reason, at least a part of the fourth surface 20B of the second polarizer PL2 is exposed from the second polarizer PL2.

The second resin film 52 is formed to be higher than the second substrate SUB2 in the thickness direction Z, and covers the fourth surface 20B of the second flexible base 20 exposed from the second polarizer PL2. In other words, the second resin film 52 is thicker than the second substrate SUB2 in the thickness direction Z, and mounts on the second substrate SUB2 to fix at least a part of the fourth surface 20B (upper surface) from the upper side. In contrast, the second resin film 52 is formed to be lower than the second polarizer PL2 in the thickness direction Z. The second resin film 52 covers a part of the end surface of the second polarizer PL2 but does not mount on the second polarizer PL2. For this reason, the second polarizer PL2 and the second resin film 52 do not overlap each other in planar view.

The second resin film 52 may be formed to be higher (thicker) or lower (thinner) than the first resin film 51 in the thickness direction Z. In the example shown in FIG. 6, the second resin film 52 is formed to be higher than the first resin film 51, and overlaps a part of the end portion 51E of the first resin film 51 which faces the first end portion E1 of the second substrate SUB2 in planar view. For this reason, the end portion 51E of the first resin film 51 is protected by the second resin film 52.

Figure 7:
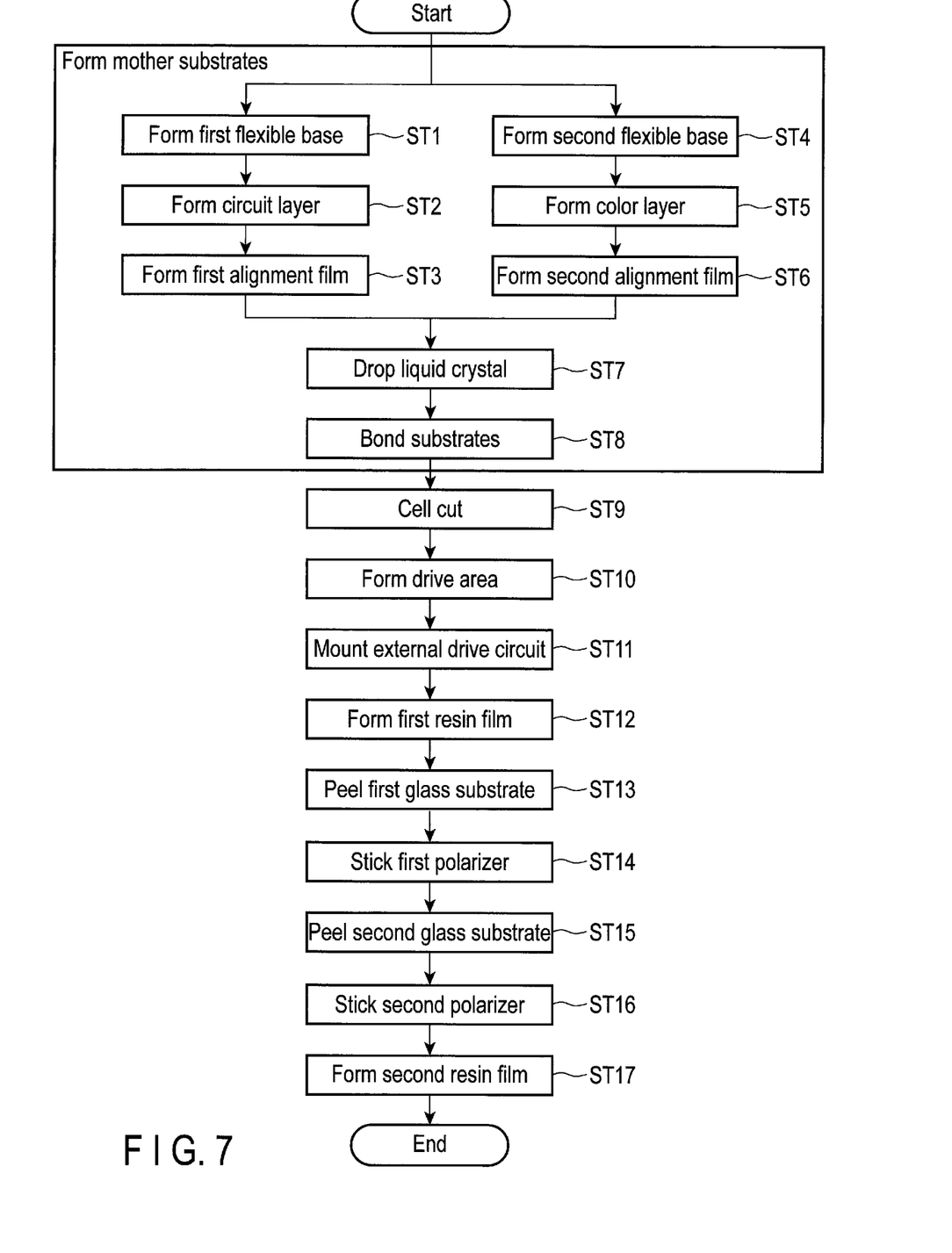
FIG. 7 is a flowchart showing an example of a method of manufacturing the electro-optical device according to the first embodiment.

FIG. 7 is a flowchart showing an example of a method of manufacturing the electro-optical device DSP. The method of manufacturing the electro-optical device DSP includes steps of preparing the first substrate SUB1, steps of preparing the second substrate SUB2, and steps of bonding the first substrate SUB1 and the second substrate SUB2 and mounting the external drive circuit 4.

Steps ST1 to ST3 for preparing the first substrate SUB1 will be explained. First, the material of the first flexible base 10 is applied to the upper surface of the first glass substrate, and the applied material is cured to form the first flexible base 10 (ST1: Form first flexible base). For example, if a composition containing polyamide acid is applied onto the first glass substrate and subjected to thermal treatment at 300 to 500° C. to generate imides, the first flexible base 10 of a polyimide film can be formed.

The above-explained scanning signal line G, video signal line S, semiconductor layer SC, common electrode CE, pixel electrode PE, first to fifth insulating layers 11, 12, 13, 14, and 15, and the like are deposited on the first flexible base 10, and the circuit layer 30 is formed (ST2: Form circuit layer). The circuit layer 30 shown in FIG. 6 includes the terminals 31 and the conductive lines 32 in the drive area. The material of the first alignment film AL1 is applied onto the circuit layer 30, and the applied material is cured to form the first alignment film AL1 (ST3: Form first alignment film). A mother substrate including the plural first substrates SUB1 is obtained through steps ST1 to ST3.

Next, the procedure of ST4 to ST6 for preparing the second substrate SUB2 will be explained. The second flexible base 20 is formed on the second glass substrate, similarly to step ST1 (ST4: Form second flexible base). The above-explained color filter layer 21, color filter layer 22, overcoat layer 23, and the like deposited on the second flexible base 20 to form the color layer (ST5: Form color layer). The second alignment film AL2 is formed on the color layer, similarly to step ST3 (ST6: Form second alignment film). A mother substrate including the plural second substrates SUB2 is obtained through steps ST4 to ST6.

Next, steps ST7 to ST13 of bonding the first substrate SUB1 and the second substrate SUB2 and mounting the external drive circuit FPC will be explained. The material of the sealing member SE is applied to either of the mother substrates and the liquid crystal material of the liquid crystal layer LC is dropped onto the inside surrounded by the sealing member SE (ST7: Drop liquid crystal). Two mother substrates are bonded to each other and the sealing member SE is cured (ST8: Bond substrates). The method of injecting the liquid crystal layer LC is not limited to steps ST7 and ST8 (One Drop Fill). A vacuum injection method of first bonding the first substrate SUB1 and the second substrate SUB2 and then injecting the liquid crystal layer LC may be employed.

The mother substrates including the first substrate SUB1 and the second substrate SUB2 are cut together with the first and second glass substrates and fragmented into panels (ST9: Cell cut). A part of the second substrate SUB2 is cut by laser light to expose the terminals 31 of the first substrate SUB1 (ST10: Form drive area). The drive area 3 is thereby formed. Steps ST9 and ST10 may be integrated into one step. In the second glass substrate cut simultaneously with the second substrate SUB2, the end surface E6 (represented by a one-dot-chained line in FIG. 9) is formed to be flush with the first end surface E1 of the second substrate SUB2.

The external drive circuit 4 is mounted on the exposed terminals 31 (ST11: Mount external drive circuit). An anisotropically conductive film is disposed on the terminal 31. The anisotropically conductive film is a film-shaped adhesive containing uniformly dispersed conductive particles. The external drive circuit 4 and the first substrate SUB1 are pressed and heated from the upper and lower sides. The anisotropically conductive film is partially molten, and the external drive circuit 4 and the first substrate SUB1 are connected electrically and mechanically with each other.

The material of the first resin film 51 is applied to the drive area 3 other than the gap OP, and the applied material is cured to form the first resin film 51 (ST12: Form first resin film). By preliminarily protecting the drive area 3, breakage of the member of the drive area 3 can be prevented in following steps ST13 to ST15. The first glass substrate is peeled from the first flexible base 10 (ST13: Peel first glass substrate). When the first flexible base 10 is irradiated with laser light through the transparent first glass substrate, the first flexible base 10 absorbs the laser light and is decomposed slightly. A gap occurs in an interface between the first flexible base 10 and the first glass substrate, and the first glass substrate is peeled from the first flexible base 10 (Laser Lift Off).

The first polarizer PL1 is stuck on the second surface 10B of the first flexible base 10 via the first adhesive layer AD1 (ST14: Stick first polarizer). The first polarizer PL1 imparts rigidity to the first substrate SUB1. The second glass substrate is peeled from the second flexible base 20 similarly to step ST13 of peeling the first glass substrate (ST15: Peel second glass substrate). Various problems of step ST15 will be explained below in detail with reference to FIG. 8A to FIG. 9.

The second polarizer PL2 is stuck on the fourth surface 20B of the second flexible base 20 via the second adhesive layer AD2 (ST16: Stick second polarizer). The material of the second resin film 52 is applied to the gap OP, and the applied material is cured to form the second resin film 52 (ST17: Form second resin film). The backlight BL is embedded in the obtained panel and then the electro-optical device DSP is completed.

The method may further comprise a step of bending the external drive circuit 4 to the back surface of the electro-optical panel PNL after step ST17. The method may further comprise a step of sticking the electro-optical panel PNL to a protective member (housing) such as a cover glass or a step of curving the display surface of the electro-optical panel PNL along a curved surface of the cover glass.

Figure 8A:
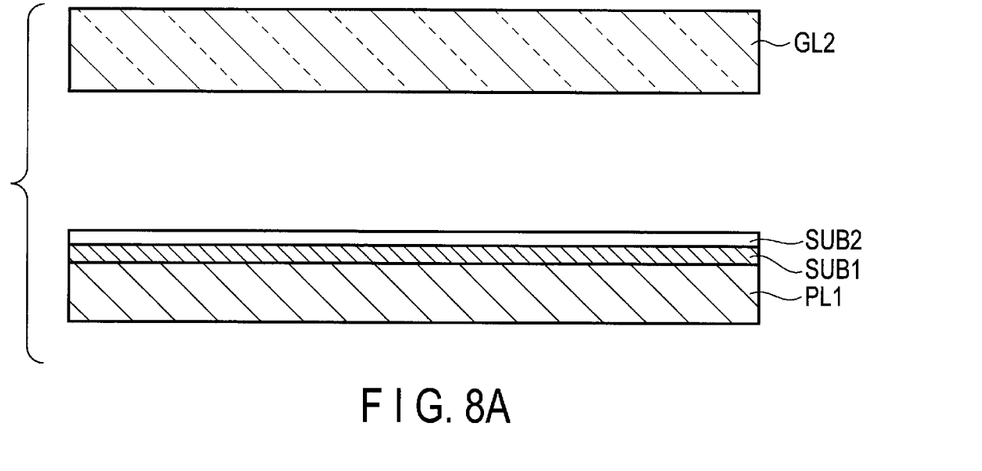
FIG. 8A is a cross-sectional view schematically showing a state of a work in step ST15 shown in FIG. 7.
Figure 8B:
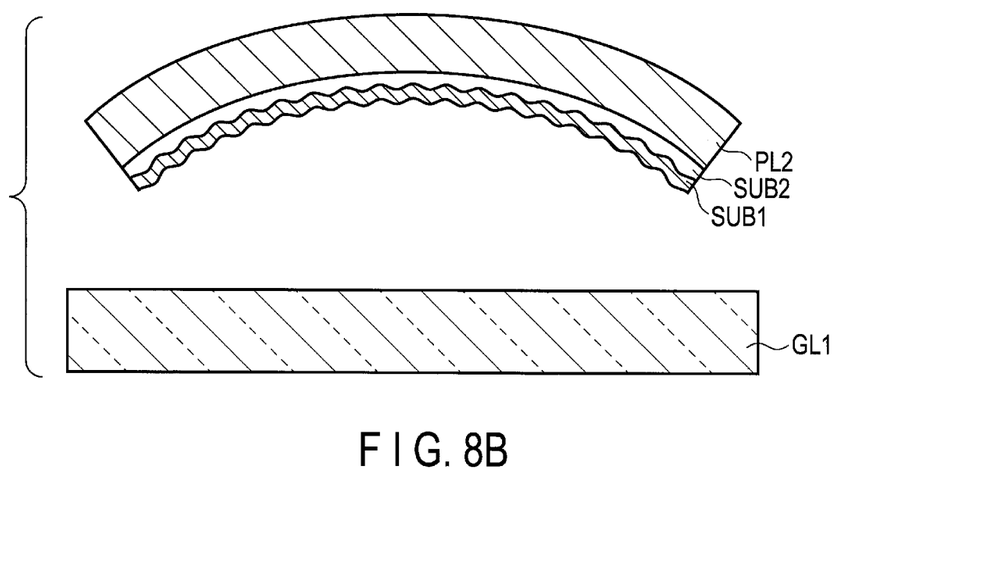
FIG. 8B is a cross-sectional view schematically showing a state of a work in a case where a first glass substrate is peeled in a state in which a second glass substrate is already peeled.

FIG. 8A is a cross-sectional view schematically showing a state of a work in step ST15 shown in FIG. 7, and FIG. 8B is a cross-sectional view schematically showing a state of a work in a case where the first glass substrate is peeled in a state in which a second glass substrate is already peeled. The first flexible base 10 of the first substrate SUB1 and the second flexible base 20 of the second substrate SUB2 are formed of a resin material such as polyimide resin.

In steps ST13 and ST15, the flexible first and second substrates SUB2 are shrunk when peeled from a first glass substrate GL1 and a second glass substrate GL2. The proportion of the thickness of the resin material (organic material) to the thickness of the second substrate SUB2 is higher than the proportion of the thickness of the resin material (organic material) to the thickness of the first substrate SUB1. The second substrate SUB2 is therefore shrunk more largely than the first substrate SUB1 in which the hard circuit layer 30 is formed to be thick.

As shown in FIG. 8A, when the first substrate SUB1 is supported by the first polarizer PL1, the first polarizer PL1 holds the shape of the first substrate SUB1 even if the second glass substrate GL2 is peeled from the second substrate SUB2. The second polarizer PL2 is thereby easily stuck to the second substrate SUB2. In contrast, as shown in FIG. 8B, when the first substrate SUB1 is not supported by the first polarizer PL1, the first substrate SUB1 having smaller shrinkage than the second substrate SUB2 may shrink if the second substrate SUB2 shrinks.

As a measure to solve this, a protective film which is not used as a part of the final product used in the manufacturing steps may be temporarily stuck on the second surface 10B to impart rigidity to the first substrate SUB1. However, if a protective film is used to improve handling in the manufacturing steps, steps of sticking and peeling the protective film may be added and the manufacturing steps may be extended. The costs for purchasing the protective film may also increase.

According to the manufacturing method according to the first embodiment as shown in FIG. 7, the first substrate SUB1 having smaller shrinkage than the second substrate SUB2 is peeled from the first glass substrate GL1 and stuck on the first polarizer PL1, then the second substrate SUB2 having larger shrinkage is peeled from the second glass substrate GL2, and the shrinkage of the first substrate SUB1 can be thereby suppressed without using a protective film.

However, if the first glass substrate GL1 is peeled from the work and stuck on the first polarizer PL1 prior to the second glass substrate GL2, the rigidity of the drive area 3 which overlaps the first glass substrate GL1 but does not overlap the first polarizer PL1 is considered poor. As explained above, use of the protective film is undesirable from the viewpoint of the costs. If a resin film is formed to protect the drive area 3, the second glass substrate GL2 is bonded to the resin film and cannot be peeled from the second substrate SUB2.

Figure 9:
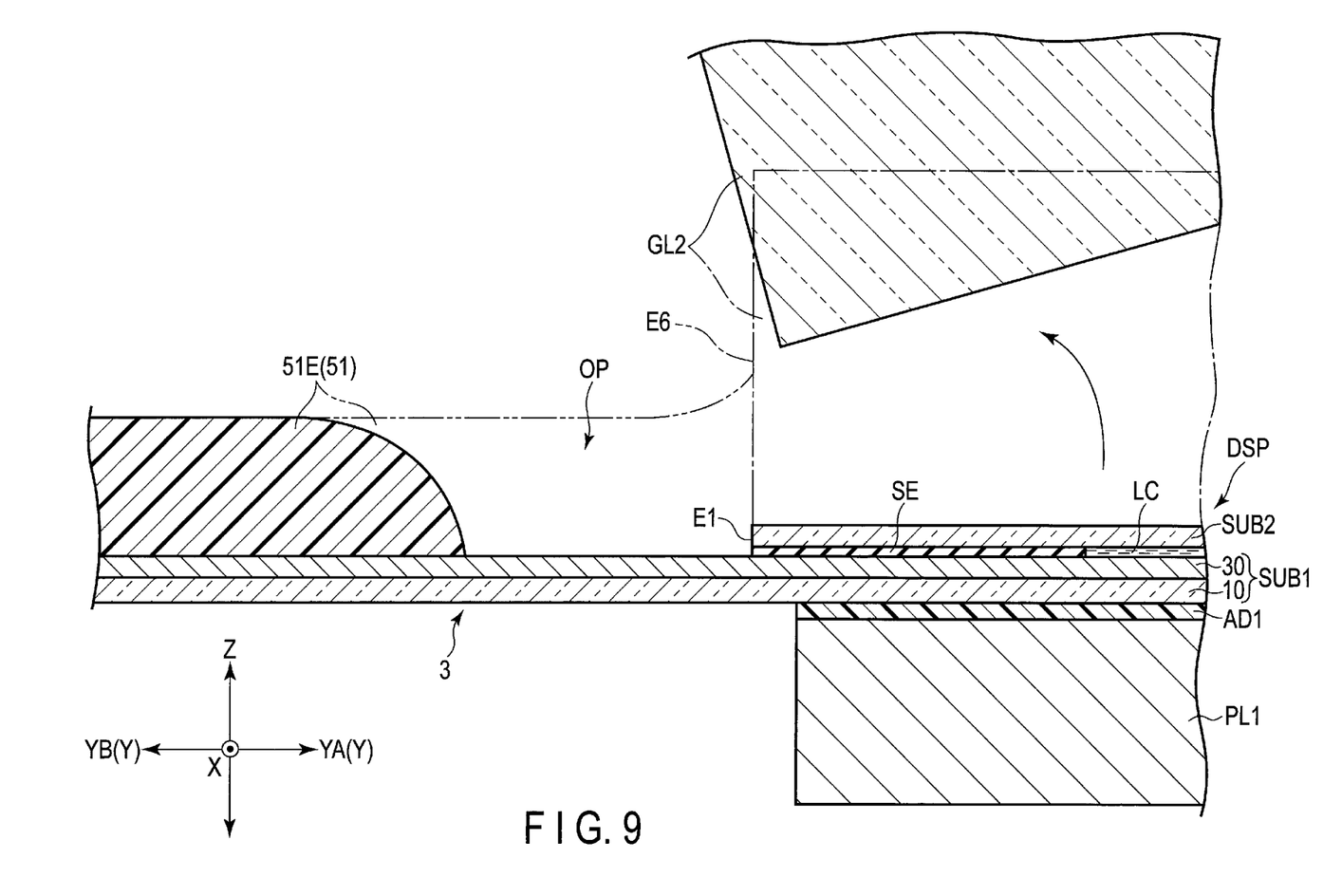
FIG. 9 is a cross-sectional view showing the drive area in step ST15 shown in FIG. 7.

FIG. 9 is a cross-sectional view showing the drive area 3 in step ST15 shown in FIG. 7. If the first resin film 51 which is in contact with the second glass substrate GL2 is formed as represented by two-dot-chained line in FIG. 9, the second glass substrate GL2 cannot be peeled in step ST15. In contrast, in the electro-optical device DSP of the first embodiment, the gap OP is formed between the end surface 51E of the first resin film 51 and the end surface E6 of the second glass substrate GL2, in step ST15, as represented by a solid line in FIG. 9.

The electro-optical device DSP of the first embodiment constituted as explained above comprises the first resin film 51 which overlaps the conductive lines 32 of the drive area 3. Since the conductive lines 32 can be protected by the first resin film 51, the protective film for protecting the conductive lines 32 in the manufacturing steps does not need to be stuck. The step of sticking the protective film and the step of peeling the protective film can be omitted and the manufacturing steps can be simplified. The costs for purchasing the protective film can also be reduced. The first resin film 51 is 90% or more of the width W0 of the drive area 3 in the second direction Y and can sufficiently protect the conductive lines 32 in step ST15.

In the first embodiment, the gap OP is formed between the end surface 51E of the first resin film 51 and the end surface E1 of the second substrate SUB2. The end surface E6 of the second glass substrate GL2 is formed to be flush with the first end surface E1 of the second substrate SUB2, in step ST10 of forming the drive area 3. Since the electro-optical device DSP according to the first embodiment has much flexibility, the second glass substrate GL2 needs to be peeled from the second flexible base 20 in the manufacturing steps. If the second glass substrate GL2 is bonded to the first resin film 51 formed in the drive area 3, the second glass substrate GL2 cannot be peeled.

According to the first embodiment, as shown in FIG. 9, the gap OP is formed between the end surface 51E of the first resin film 51 and the end surface E6 of the second glass substrate GL2, in step ST15. Peeling the second glass substrate GL2 cannot be restricted by the first resin film 51. The second resin film 52 is formed in the gap OP in a step after ST15. The conductive lines 32 of the electro-optical device DSP can be protected for a long time by the first resin film 51 and the second resin film 52 which completely cover the drive area 3.

The second resin film 52 is mounted on the second substrate SUB2 so as to cover at least a part of the fourth surface 20B. In the example shown in FIG. 6, the end surface E5 of the second polarizer PL2 is located more closely to the electro-optical area DA side than the first end surface E1 of the second substrate SUB2, and the second resin film 52 covers the fourth surface 20B exposed from the second polarizer PL2. The first embodiment can protect the first end surface E1 of the second substrate SUB2 by the second resin film 52 and can fix the second substrate SUB2 from the upper side.

If the first resin film 51 overlaps an area where the second polarizer PL2 is provided, the first resin film 51 may be a disturbance in step ST16 of sticking the second polarizer PL2. In the first embodiment, the first resin film 51 is formed so as not to overlap an area where the second polarizer PL2 is provided, and they are not disturbances in step ST16.

Furthermore, various preferable advantages can be obtained from the first embodiment.

Next, an electro-optical device DSP according to a second embodiment and a third embodiment will be explained with reference to FIG. 10 and FIG. 11. The constituent elements which are the same as or similar to those of the first embodiment are denoted by the same reference numerals, with reference to the explanations of the first embodiment, and their explanations are omitted here. In addition, the other constituent elements are the same as those of the first embodiment.

Second Embodiment

Figure 10:
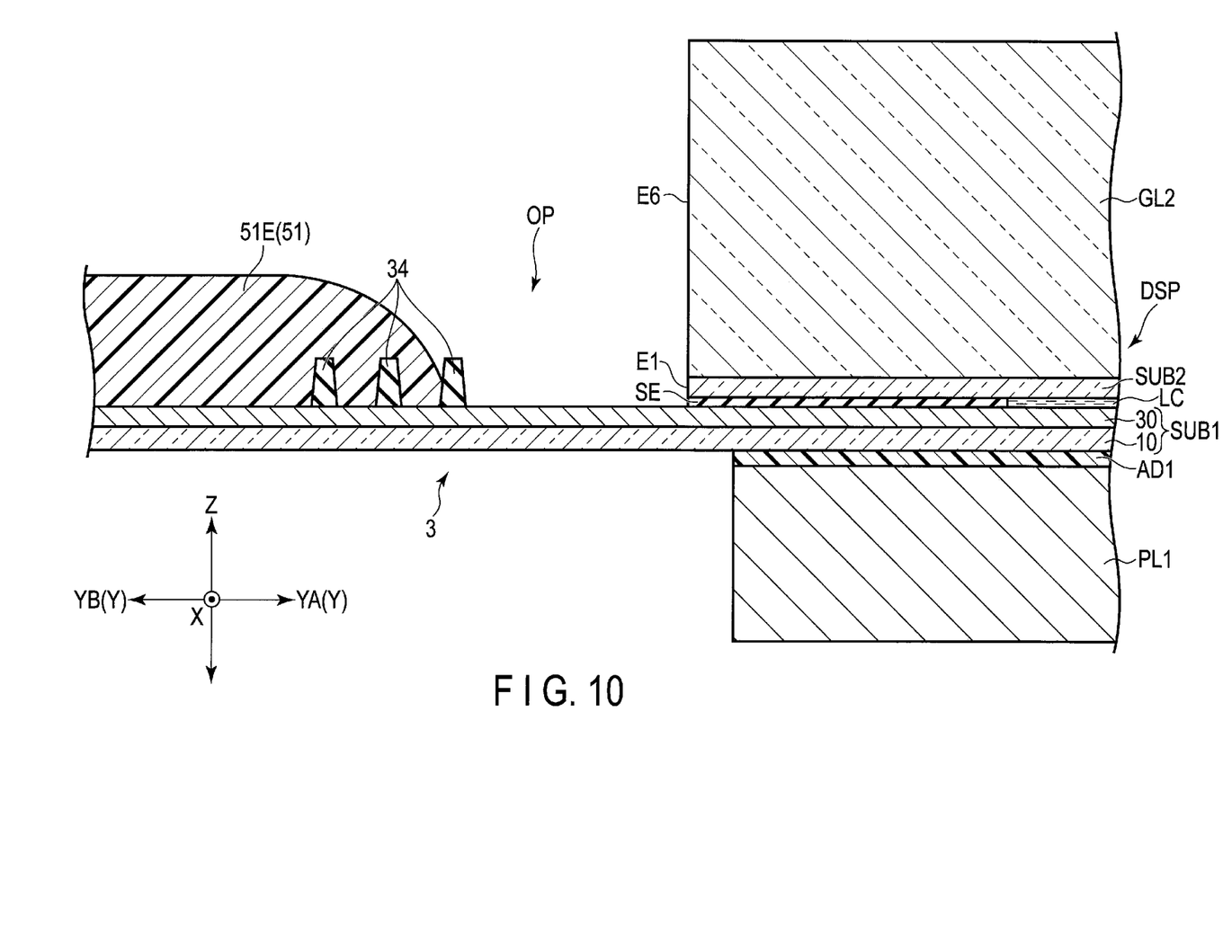
FIG. 10 is a cross-sectional view showing a schematic configuration of an electro-optical device according to a second embodiment.

FIG. 10 is a cross-sectional view showing a schematic configuration of an electro-optical device DSP according to the second embodiment. The second embodiment is different from the first embodiment with respect to a feature that first protrusions 34 are formed near a first resin film 51. The first projections 34 protrude from a surface of a drive area 3 in a thickness direction Z, and extend from a first end surface E1 of a second substrate SUB2, in a first direction X, so as to form a gap OP. In other words, the first projections 34 are projections which extend along the first end surface E1. The number of the first protrusions 34 may be single or two or more.

The first projections 34 are formed of, for example, photosensitive acrylic resin and formed in step ST2. Concaves recessed from the surface of the drive area 3 in the third direction and extending along the first end surface E1 may be formed instead of the first protrusions 34. If the concaves are formed, for example, thickness of a fourth insulating layer 14 may be partially varied by multi-tone processing such as halftone processing. Alternatively, the first resin film 51 and a second resin film 52 may be formed of different materials, and a liquid repellent material which can be in close contact with the material of the second resin film 52 but can repel the material of the first resin film 51 may be applied.

In step ST12, the applied material of the first resin film 51 is interrupted by the first protrusions 34 and expands along the first protrusions 34 by surface tension. According to the second embodiment, the pre-cured first resin film 51 can be prevented from extending beyond the first projections 34 even if the amount of application of the first resin film 51 is varied. Thus, the gap OP can be adjusted to predetermined width W0 by controlling the shape of the end portion 51E of the first resin film 51.

Third Embodiment

Figure 11:
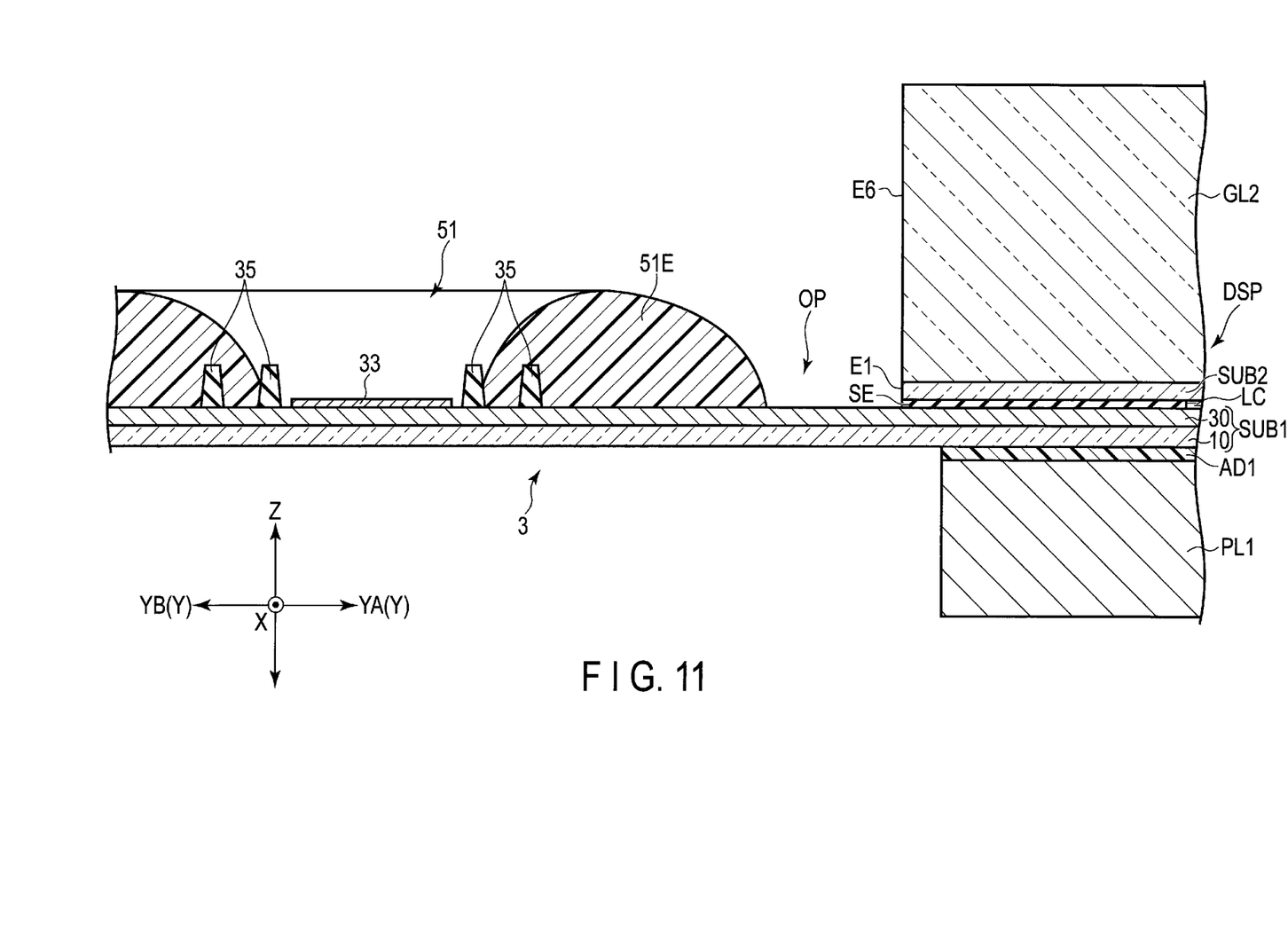
FIG. 11 is a cross-sectional view showing a schematic configuration of an electro-optical device according to a third embodiment.

FIG. 11 is a cross-sectional view showing a schematic configuration of an electro-optical device according to a third embodiment. The third embodiment is different from the first embodiment with respect to a feature that second protrusions 35 are formed near a conductive pad 33. The second protrusions 35 are projections similarly to the first projections 34 and can be formed in step ST2. The second protrusions 35 are formed to have an annular shape larger than the conductive pad 33 and surround the conductive pad 33. In the example shown in FIG. 11, the second protrusions 35 are formed in a shape of double stripes. The second protrusions 35 may be formed in a shape of a single stripe or triple or more stripes. A part of the annular shape of the second protrusions 35 may be cut.

The conductive pad 33 is a transparent conductive film formed of, for example, indium tin oxide (ITO) or indium zinc oxide (IZO). If the first resin film 51 and the second resin film 52 are formed on the conductive pad 33, the first resin film 51 and the second resin film 52 may be peeled at the conductive pad 33, in steps ST13 and ST15. If the first resin film 51 and the second resin film 52 are further peeled, the conductive lines 32 formed in the drive area 3 cannot be sufficiently protected.

The third embodiment can prevent the pre-cured first resin film 51 and second resin film 52 from extending over the conductive pad 33, by the second protrusions 35. Thus, peeling the first resin film 51 and the second resin film 52 at the conductive pad 33 can be prevented and the conductive lines 32 formed in the drive area 3 can be certainly protected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The constituent elements disclosed in the embodiments can be combined arbitrarily. For example, steps ST16 and ST17 may be replaced with each other in the steps of manufacturing the electro-optical device DSP. If the second resin film 52 is small, variation in the unevenness can be absorbed by the thickness of the second adhesive layer AD2.

What is claimed is:
1. n electro-optical device comprising:
   a flexible first substrate and a flexible second substrate which include an electro-optical area;
   a drive area in the first substrate with terminals formed in the drive area;
   an external drive circuit connected to the terminals;
   conductive lines in the drive area extending from the terminals to the electro-optical area side; and
   a first resin film overlapping the conductive lines, wherein
   the second substrate overlaps the first substrate,
   the first substrate is larger than the second substrate and includes the drive area exposed from the second substrate, the first resin film is disposed on the drive area and does not overlap the e ectro-optical area,
   a gap is formed between the first resin film and the second substrate in planar view, and
   the first resin film does not contact the second substrate.
2. The electro-optical device of claim 1, further comprising:
   a second resin film which covers the gap.
3. The electro-optical device of claim 2, wherein
   the second resin film covers at least a part of the second substrate.
4. The electro-optical device of claim 1, wherein
   a width of the first resin film is 90% or more and less than 100% of a width of the drive area, in a direction from the terminals to the electro-optical area.
5. The electro-optical device of claim 2, further comprising:
   a polarizer Which overlaps the second substrate, wherein
   an end portion of the polarizer is located more closely to the electro-optical area side than an end portion of the second substrate.
6. The electro-optical device of claim 5, wherein
   the polarizer and the second resin film do not overlap each other in planar view.
7. The electro-optical device of claim 1, further comprising:

a first protrusion which extends in a direction intersecting a direction of extension of the conductive lines of the external drive circuit, wherein the first protrusion is located near the first resin film.

8. The electro-optical device of claim 1, further comprising:

a conductive pad disposed in the drive area to be conductive with the second substrate or a conductive member which overlaps the second substrate, wherein the conductive pad does not overlaphe first resin film in planar view.

9. The electro-optical device of claim 8, further comprising:

a second protrusion disposed near the conductive pad.

10. The electro-optical device of claim 2, wherein a width of the first resin film is same as a width of the second resin film, in a direction in which the terminals are arranged.

11. The electro-optical device of claim 2, wherein a width of the second resin film is smaller than a width of the first resin film, in a direction in which the terminals are arranged.

12. The electro-optical device of claim 2, wherein the second resin film covers an end surface and an upper surface of the second substrate.

13. The electro-optical device of claim 2, wherein the second resin film is thicker than the second substrate in a thickness direction of the first substrate and the second substrate.

14. The electro-optical device of claim 2, wherein the second resin film is thicker than the first resin film in a thickness direction of the first substrate and the second substrate.

15. The electro-optical device of claim 2, wherein the second resin film covers an end portion of the first resin film.

16. The electro-optical device of claim 5, wherein the second resin film covers at least a part of an end surface of the polarizer in a thickness direction of the first substrate and the second substrate.

17. The electro-optical device of claim 8, further comprising:

a polarizer which overlaps the second substrate, wherein the conductive member is a conductive adhesive which bonds the polarizer and the second substrate.

18. The electro-optical device of claim 8, wherein a certain voltage is applied to the conductive member via the conductive pad.

19. The electro-optical device of claim 8, wherein the conductive member is a transmitter electrode or a receiver electrode of a touch panel.

20. The electro-optical device of claim 8, further comprising:

a conductive paste which electrically connects the conductive member and the conductive pad to each other.

* * * * *